(12) United States Patent
Gonzalez et al.

(10) Patent No.: US 10,595,056 B2
(45) Date of Patent: Mar. 17, 2020

(54) FRAME ACCURATE SPLICING

(71) Applicant: Google LLC, Mountain View, CA (US)

(72) Inventors: Jose M. Gonzalez, San Jose, CA (US); Sean Harvey, San Carlos, CA (US); Daniel Stephen Padgett, San Francisco, CA (US); Tyrone Nakahara, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/265,620

(22) Filed: Feb. 1, 2019

(65) Prior Publication Data

US 2019/0166389 A1    May 30, 2019

Related U.S. Application Data

(63) Continuation of application No. 15/275,581, filed on Sep. 26, 2016, now Pat. No. 10,218,986.

(51) Int. Cl.
*H04N 21/234* (2011.01)
*H04N 19/15* (2014.01)
*H04N 21/8547* (2011.01)
*H04N 19/169* (2014.01)
*H04N 19/46* (2014.01)
*H04N 19/172* (2014.01)

(52) U.S. Cl.
CPC ....... *H04N 21/23424* (2013.01); *H04N 19/15* (2014.11); *H04N 19/169* (2014.11); *H04N 19/46* (2014.11); *H04N 21/8547* (2013.01); *H04N 19/172* (2014.11)

(58) Field of Classification Search
CPC .................. H04N 21/23424; H04N 19/15
See application file for complete search history.

(56) References Cited

U.S. PATENT DOCUMENTS

| 5,982,436 A | | 11/1999 | Balakrishnan et al. | |
| 6,038,000 A | * | 3/2000 | Hurst, Jr. ............. | G11B 27/031 348/705 |
| 6,104,441 A | | 8/2000 | Wee et al. | |

(Continued)

OTHER PUBLICATIONS

Moore, Kevin W., "Frame-accurate Compressed Domain Splicing", In Proceedings of Annual Society of Motion Picture and Television Engineers (SMPTE), Hollywood, CA, US, Oct. 27-29, 2009, pp. 1-9.

(Continued)

*Primary Examiner* — Irfan Habib
(74) *Attorney, Agent, or Firm* — Byrne Poh LLP

(57) ABSTRACT

A video delivery system alters information (such as time stamp information) associated with one or more frames of a first compressed video file to allow for accurate rendering of frames within the first compressed video file prior to a transition to a second compressed video file. For example, a time stamp of a particular frame of a compressed video file is altered prior to transmission of the particular frame by a video transmission system such that the altered time stamp indicates a time that has already passed. The particular frame can be decoded by a display system that receives the particular frame so that information included in the particular frame can be used in rendering of subsequently received frames. The display system can bypass display of the particular frame due to the altered time stamp.

21 Claims, 4 Drawing Sheets

(56) References Cited

U.S. PATENT DOCUMENTS

| | | | | |
|---|---|---|---|---|
| 6,137,834 A * | 10/2000 | Wine | H04N 19/179 | 375/240 |
| 6,912,251 B1 | 6/2005 | Ward et al. | | |
| 7,885,270 B2 * | 2/2011 | Frink | H04N 7/52 | 370/252 |
| 8,078,696 B2 * | 12/2011 | LaJoie | G06Q 30/0256 | 709/219 |
| 8,325,764 B2 * | 12/2012 | Frink | H04N 21/23608 | 370/392 |
| 8,335,262 B2 * | 12/2012 | Hluchyj | H04N 21/23406 | 370/477 |
| 9,148,707 B2 * | 9/2015 | DiLorenzo | H04N 21/812 | |
| 9,332,050 B2 * | 5/2016 | Collard | H04L 65/607 | |
| 9,344,472 B2 | 5/2016 | Cheng et al. | | |
| 9,485,546 B2 * | 11/2016 | Chen | G11B 27/007 | |
| 9,565,397 B2 * | 2/2017 | Frink | H04N 7/17318 | |
| 9,582,238 B2 * | 2/2017 | Rajamani | G06F 3/1454 | |
| 9,762,937 B2 * | 9/2017 | Braness | H04N 21/23476 | |
| 9,843,844 B2 * | 12/2017 | Walker | H04N 21/6125 | |
| 9,906,757 B2 * | 2/2018 | Frink | H04N 7/17327 | |
| 9,917,874 B2 * | 3/2018 | Luby | H04N 21/23106 | |
| 9,986,269 B1 * | 5/2018 | Labonte | H04N 21/23605 | |
| 2002/0105911 A1 * | 8/2002 | Pruthi | H04L 41/22 | 370/241 |
| 2004/0015582 A1 * | 1/2004 | Pruthi | H04L 41/142 | 709/224 |
| 2005/0089189 A1 * | 4/2005 | Langelaar | G06T 1/0035 | 382/100 |
| 2005/0188099 A1 * | 8/2005 | Patel | H04N 7/17336 | 709/236 |
| 2005/0190781 A1 * | 9/2005 | Green | H04L 29/06027 | 370/432 |
| 2005/0220189 A1 * | 10/2005 | Brooks | H04N 19/105 | 375/240.15 |
| 2006/0050780 A1 * | 3/2006 | Cooper | H04L 1/02 | 375/240.01 |
| 2006/0230176 A1 * | 10/2006 | Dacosta | H04L 29/06027 | 709/235 |
| 2008/0086570 A1 * | 4/2008 | Dey | H04N 21/2402 | 709/231 |
| 2009/0003432 A1 * | 1/2009 | Liu | H04N 21/23406 | 375/240.01 |
| 2009/0180534 A1 * | 7/2009 | Hluchyj | H04N 21/23406 | 375/240.01 |
| 2010/0046604 A1 * | 2/2010 | Elstermann | H04N 21/23406 | 375/240.01 |
| 2010/0189131 A1 * | 7/2010 | Branam | H04N 21/23424 | 370/474 |
| 2010/0235472 A1 * | 9/2010 | Sood | H04L 65/4092 | 709/219 |
| 2011/0055209 A1 * | 3/2011 | Novac | G06F 17/211 | 707/737 |
| 2011/0064262 A1 * | 3/2011 | Chen | G06T 1/0085 | 382/100 |
| 2011/0231660 A1 * | 9/2011 | Kanungo | H04L 63/0435 | 713/168 |
| 2011/0307781 A1 * | 12/2011 | Sood | G11B 27/34 | 715/716 |
| 2012/0023251 A1 * | 1/2012 | Pyle | H04N 21/234327 | 709/231 |
| 2012/0155497 A1 * | 6/2012 | Lee | H04J 3/0697 | 370/507 |
| 2012/0174152 A1 * | 7/2012 | Ye | H04N 21/23424 | 725/36 |
| 2012/0257671 A1 * | 10/2012 | Brockmann | H04N 21/64753 | 375/240.02 |
| 2013/0042015 A1 * | 2/2013 | Begen | B63B 15/0083 | 709/231 |
| 2013/0064308 A1 * | 3/2013 | Nemiroff | H04N 21/23439 | 375/240.28 |
| 2013/0212222 A1 * | 8/2013 | Outlaw | H04L 65/4092 | 709/219 |
| 2014/0040026 A1 * | 2/2014 | Swaminathan | G06Q 30/02 | 705/14.53 |
| 2014/0099079 A1 | 4/2014 | Narayan et al. | | |
| 2014/0129618 A1 * | 5/2014 | Panje | H04N 21/26258 | 709/203 |
| 2014/0149539 A1 * | 5/2014 | MacInnis | H04L 65/4084 | 709/217 |
| 2014/0245367 A1 * | 8/2014 | Sasaki | H04N 21/4402 | 725/109 |
| 2014/0269776 A1 * | 9/2014 | Bomfim | H04N 21/64322 | 370/503 |
| 2015/0020135 A1 * | 1/2015 | Frusina | H04N 21/4621 | 725/116 |
| 2015/0082338 A1 * | 3/2015 | Logan | A23L 2/52 | 725/32 |
| 2016/0234527 A1 * | 8/2016 | Rodriguez | H04N 19/593 | |
| 2017/0105004 A1 * | 4/2017 | Chen | H04N 19/105 | |
| 2017/0105005 A1 * | 4/2017 | Chen | H04N 19/105 | |
| 2017/0208335 A1 * | 7/2017 | Ramamurthy | H04N 19/436 | |
| 2017/0272755 A1 * | 9/2017 | Holcomb | H04N 19/146 | |
| 2017/0318323 A1 * | 11/2017 | Wang | H04N 19/105 | |

OTHER PUBLICATIONS

Notice of Allowance dated Oct. 24, 2018 in U.S. Appl. No. 15/275,581.

Office Action dated Aug. 15, 2018 in U.S. Appl. No. 15/275,581.

Roach, A., "WebRTC Video Processing and Codec Requirements", last updated Jun. 12, 2015, pp. 1-7, available at: http://tools.ietf.org/id/draft-ietf-rteweb-video-06.html.

Unknown Author, "STB: Fundamentals to Develop PVR-STB Software", Tune2Wizard, last updated Feb. 13, 2015, pp. 1-3, available at: http.www.tune2wizard.com/stb-fundamentals-to-develop-pvr-stb-software/>.

Unknown Author, "Video Coding for Low Bit Rate Communication", International Telecommunication Union, ITU-T Recommendation H.263, Jan. 2005, pp. 1-226.

Wee, S. et al., "Compressed-Domain Video Processing", Hewlett-Packard, Tech. Ref. HPL-2002-282, Oct. 2002, pp. 1-36.

Wee, Susie J., "Manipulating Temporal Dependencies in Compressed Video Data with Applications to Compressed-Domain Processing of MPEG Video", In Proceedings of the International Conference on Acoustics, Speech, and Signal Processing, Phoenix, AZ, US, Mar. 15-19, 1999, pp. 1-4.

\* cited by examiner

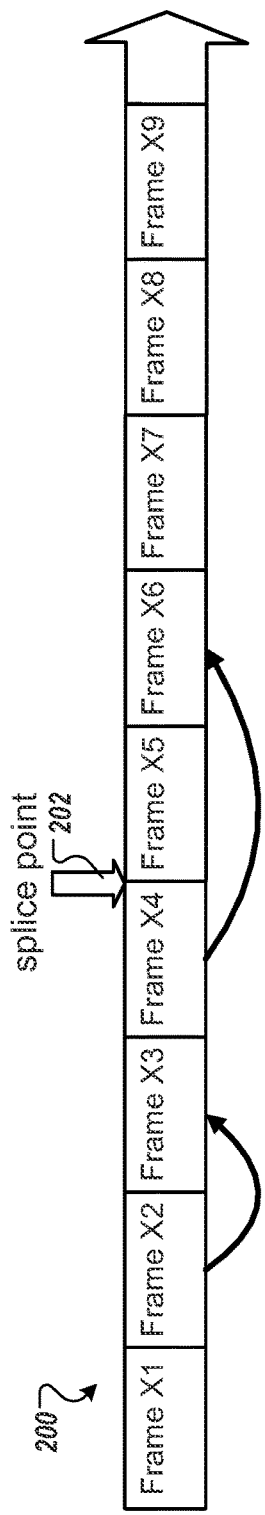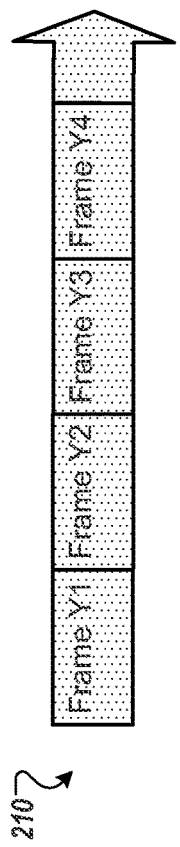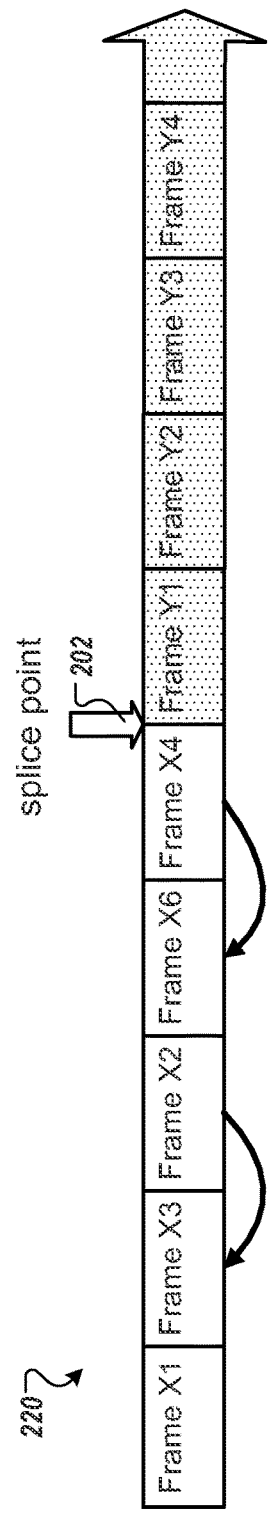

FRAME ACCURATE SPLICING

CROSS-REFERENCE TO RELATED APPLICATION

This application is a continuation of U.S. patent application Ser. No. 15/275,581, filed Sep. 26, 2016, which is hereby incorporated by reference herein in its entirety.

TECHNICAL FIELD

This document generally relates to splicing compressed video into a single presentation.

BACKGROUND

In the past, multimedia content presentations, such as television programs, are formatted to include segments of primary media content (i.e., the television show) and empty segments in which secondary content such as station identifiers, news updates, location or region specific content, and other content can be inserted. Insertion was performed by transmitting the secondary content during an appropriate time relevant to the primary media content. As streaming digital media has become more common, compression based file formats for storing and transmitting video data have been developed.

SUMMARY

This document describes techniques, methods, systems, and other mechanisms for splicing two segments of compressed video data to provide a single video presentation on a display device. The techniques, methods, systems, and other mechanisms described herein include processes for altering information associated with one or more frames of a first compressed video file to allow for accurate rendering of frames within the first compressed video file prior to a transition to a second compressed video file. In some implementations, time stamp information for one or more frames of a compressed video file is altered. For example, a time stamp of a particular frame of a compressed video file is altered prior to transmission of the particular frame by a video transmission system such that the altered time stamp indicates a time that has already passed. The particular frame can be decoded by a display system that receives the particular frame so that information included in the particular frame can be used in rendering of subsequently received frames. After the subsequent frame that depends on the particular frame for accurate rendering has been transmitted, the video transmission system can begin transmitting frames for a second compressed video file. The altered time stamp for the particular frame indicating a time in the past indicates to the display system that the particular frame has already been presented and should not be presented again even if the particular frame had not actually been previously presented by the display system. The display system therefore bypasses display of the particular frame, but is able to use information included in the particular frame to render the subsequently received frame. After presentation of the subsequently received frame, the display system begins to display frames from the second compressed video file according to presentation time stamps for the frames of the second compressed video files.

In general, one innovative aspect of the subject matter described in this specification can be embodied in a computing device having a memory storing data and instructions and one or more processors that execute instructions stored on the memory. The instructions can cause the one or more processors to execute instructions that perform actions including receiving, by a computing system, first compressed video content; receiving, by the computing system, second compressed video content; identifying, by the computing system, a splice point for the first compressed video content; identifying a particular frame in the first compressed video content that precedes the splice point; determining that the particular frame depends on information included in a subsequent frame of the first compressed video content that is after the splice point; altering, by the computing system and in response to determining that the particular frame depends on information included in the subsequent frame, time stamp information of the subsequent frame; and transmitting, by the computing system and to a video presentation system, the particular frame, the subsequent frame along with the altered time stamp information, and at least a portion of the second compressed video content.

These and other embodiments can each optionally include one or more of the following features. Altering the time stamp information of the subsequent frame can include reading a presentation time stamp value associated with the subsequent frame; subtracting a particular value from the presentation time stamp value; storing the resulting value of subtracting the particular value from the presentation time stamp value as a new presentation time stamp for the subsequent frame. The particular value can be between 5 ms and 150 ms. The particular value can be approximately 20 ms. The particular value can be determined based on one or more characteristics of a frame buffer of the video presentation system. The one or more characteristics of the frame buffer can include an amount of time that the video presentation system retains decoded frames in the frame buffer. Transmitting the particular frame, the subsequent frame along with the altered time stamp information, and at least a portion of the second compressed video content comprises transmitting the subsequent frame prior to the particular frame and transmitting the at least a portion of the second compressed video content after the particular frame.

The computing system can identify a second splice point for the second compressed video content. The computing system can identify an additional frame in the second compressed video content that is after the second splice point. The computing system can determine that the additional frame depends on information included in a preceding frame of the second compressed video content that is before the second splice point. The computing system can alter time stamp information of the preceding frame. The computing system can alter the time stamp in response to determining that the additional frame depends on information included in the preceding frame, and prior to transmitting the particular frame, the subsequent frame along with the altered time stamp information, and at least a portion of the second compressed video content. The at least the portion of the second compressed video can include the additional frame and the preceding frame.

Particular embodiments of the subject matter described in this specification can be implemented so as to realize one or more of the following advantages. A video presentation can be created from two or more compressed video files without requiring the individual video files to be decompressed and recompressed. All of the information needed to decode and display a frame of a compressed video file that relies in information in a subsequent frame and that is to be displayed prior to a splice point with another video can be provided to a display system without requiring the subsequent frame to be displayed. A frame that relies on information from a subsequent frame to be decoded and displayed can be transmitted to, decoded by, and displayed by a video display system without requiring the frame to be decoded and re-encoded as a different type of frame. A compressed video transmission system can transmit portions of compressed video files that are spliced together to create a single video presentation without having to convert B-frames from the first compressed video that are to be presented just prior to the splice point to I-frames or P-frames. Prevents loss of content necessary for rendering one or more frames prior to a splice point in a combined video presentation that rely on information included in frames located after the splice point in an original video file on which the combined video presentation is based. Avoids presentation of frames located after a splice point in an original video file on which a combined video presentation is based while ensuring that the information included in those frames is available for decoding of other frames.

Other features, aspects, and advantages of the subject matter will become apparent from the description, the drawings, and the claims.

BRIEF DESCRIPTION OF THE DRAWINGS

FIG. 2A illustrates an example frame display sequence for a primary content compressed video file.

FIG. 2B illustrates an example frame display sequence for a secondary content compressed video file.

FIG. 2C illustrates an example frame transmission sequence for a combined video made up of frames from two different compressed video files.

Like reference numbers and designations in the various drawings indicate like elements.

DETAILED DESCRIPTION

Figure 1:
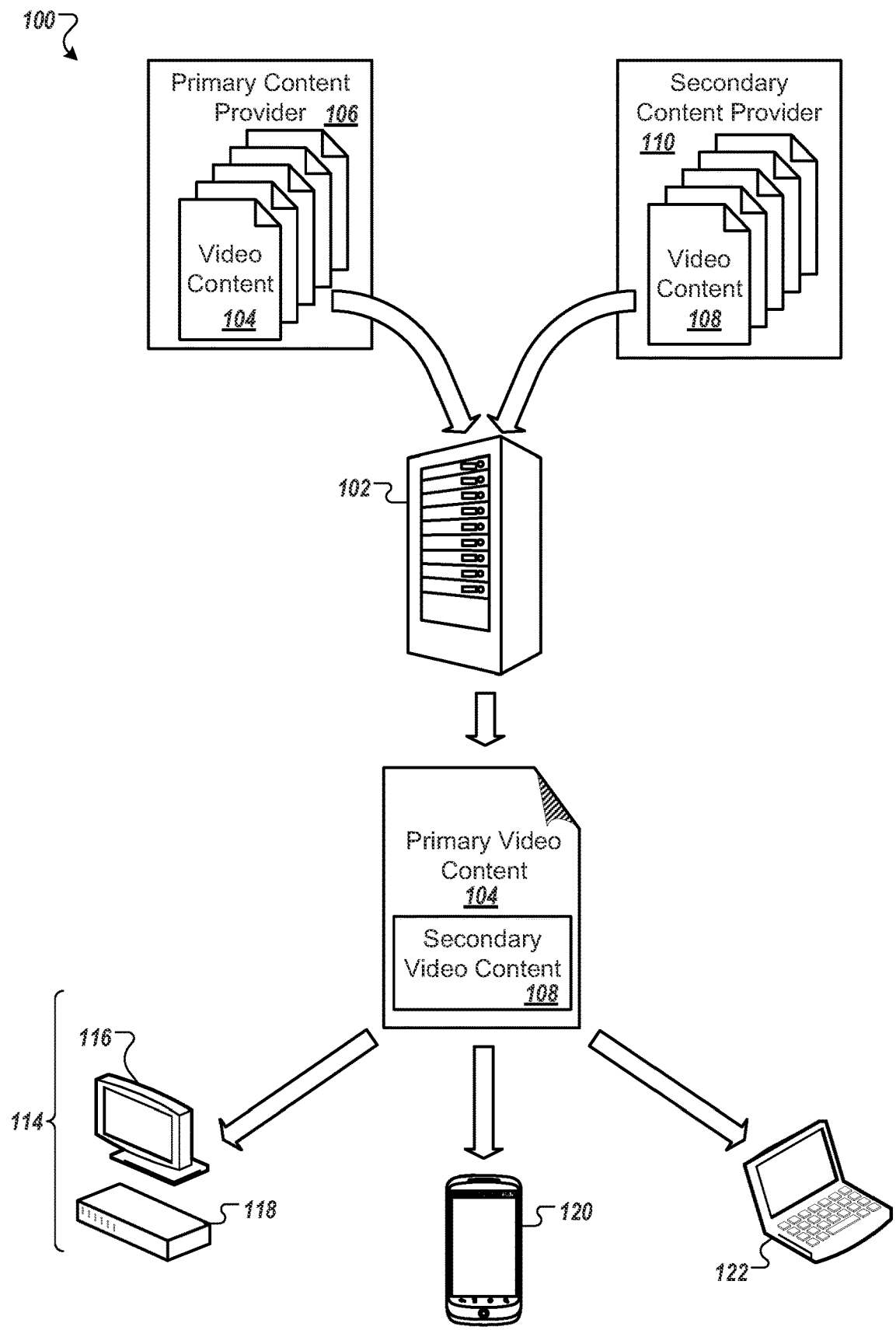
FIG. 1 is a block diagram of an example system for splicing compressed video files for presentation as a single video presentation.

Video compression allows for video content to be stored and transmitted more efficiently while using less resources. For example, transmitting video in a compressed format frees up more data transmission resources than transmission of non-compressed video, thereby freeing up resources for transmission of additional video content or transmission to a larger number of recipient devices. Examples of video compression formats include standards set by the Moving Picture Experts Group (MPEG) often referred to as "MPEG" formats. Examples of MPEG formats used in a variety of applications include the MPEG-2 formats and the MPEG-4 formats.

In some compressed video formats (such as, for example, the H.264/MPEG-4 AVC (MPEG-4 Part 10) format) some frames of a compressed video are entirely or partly interceded, i.e., the frames are rendered using information derived from other frames in the compressed video as reference. In some video formats, frames can be classified according to if they are inter-coded or intra-coded (non-inter-coded) frames. An intra-coded frame or Intra-frame (often abbreviated as "I-frame") can be decoded independently of any other frames in a compressed video. In other words, all of the information necessary for rendering an I-frame is contained within the I-frame itself and rendering of the I-frame does not require information from other frames.

Furthermore, inter-coded frames (frames that require information from one or more other frames to be decoded) can be divided into two classifications: Predicted-frames (often abbreviated as "P-frames") and Bidirectional-frames (often abbreviated as "B-frames"). P-frames can improve compression by exploiting the temporal (over time) redundancy in a video. A P-frame stores only the difference in image from the frame (either an I-frame or P-frame) immediately preceding it (this reference frame is sometimes referred to as an "anchor frame"). A display system receiving a P-frame uses information included in the anchor frame along with the difference in image information included in the P-frame itself to render the P-frame.

B-frames are similar to P-frames in that they are also inter-coded frames and can improve compression by exploiting temporal redundancy in a video. However, B-frames rely on information included in both a prior frame and subsequent frame for decoding (e.g., the B-frame relies on two anchor frames). The B-frame relies on both information included in the prior frame and the subsequent frame along with difference information included in the B-frame itself. A display system rendering a B-frame must therefore decode the next I-frame or P-frame that sequentially follows the B-frame in the video before the B-frame can be decoded and displayed. In some implementations, the B-frame relies on only information from a subsequent frame in the compressed video and does not rely on information from a prior frame in the compressed video.

In some video compression formats, frames have one or more associated time stamps. For example, a frame in a compressed video can have an associated presentation time stamp ("PTS") and/or an associated decoding time stamp ("DTS"). In some implementations, the PTS and DTS are offset values from a reference starting time (such as the beginning of a video). The PTS can identify the order in which frames are to be presented by a video display system by identifying times at which the frames are to be displayed. PTS values can also be used to determine when data can be discarded from a buffer storing received frames. The DTSs for frames in a compressed video identify the order in which frames are to be decoded by identifying times at which the frames are to be decoded.

In video compression formats that utilize B-frames, the DTS and PTS for some frames may differ. That is, the order in which frames of a compressed video are to be decompressed differs from the order in which the frames of the compressed video are to be displayed. This is because a B-frame relies on information included in a frame that is to be displayed after the B-frame. For example, suppose that frames 4 and 7 of a compressed video are I-frames while frame 5 of the compressed video is a B-frame. Frame 5 may rely on information included in both frames 4 and 7 to be decoded and displayed. Thus, the video display system displaying the compressed video must decode frame 7 prior to decoding frame 5 even though frame 7 is to be displayed after frame 5. In this example, frame 7 would include a DTS that is earlier than the DTS for frame 5 so that frame 7 is decoded prior to frame 5. Decoding frame 7 prior to frame 5 ensures that the information included in frame 7 is available for use in decoding and rendering frame 5. In this example, frame 7 would have a PTS that is later than the PTS for frame 5 (and frame 6) because frame 7 is to be presented after frame 5.

In some implementations, frames in a compressed video may be associated with a PTS but not with a DTS. For example, in some video compression formats, the frames are decoded in the order in which they are received and are presented in the order determined by the PTS of each frame. For example, a video stream might include frames 1, 2, 3, 4, and 5 that are to be presented in numerical order. Each of frames 1, 2, 3, 4, and 5 have an associated PTS that collectively identify that frames 1, 2, 3, 4, and 5 are to be displayed in in the order: 1, 2, 3, 4, 5. In this example, assume frame 3 is a B-frame that relies on frame 4 for at least some information. A video transmitting system that transmits the frames of the compressed video can transmit the frames in the order: 1, 2, 4, 3, 5. The video display system decodes the frames in the order received and therefore frame 4 is decoded prior to frame 3 which makes the information included in frame 4 available for use in decoding and rendering frame 3. However, the frames are presented in the order identified by the respective PTSs of the frames. In this example, the frames are stored in a frame buffer after they are decoded. Therefore, frame 4 can be decoded prior to frame 3 and the decoded frame 4 is stored in the frame buffer. The decoded frame 4 is therefore available for use in decoding frame 3, which is then stored in the frame buffer in its decoded format. The video display system can then retrieve frame 3 and frame 4 from the frame buffer for presentation in the order dictated by the respective PTSs of the frames.

Turning to FIG. 1, a block diagram of an example system 100 for splicing video content is depicted. In general, a data processing system such as a content server 102 can receive compressed video content from various sources and provide different segments of video content to video display systems for presentation as a single video presentation to users of the video display systems. In the example shown, the content server 102 receives primary video content 104 from a primary content provider 106 and secondary video content 108 from a secondary video content provider 110.

In the illustrated example, the content server 102 receives one or more primary video content segments 104 that are provided by a primary content provider 106. In some implementations, the primary video content 104 can be live or pre-recorded television programs, streaming video content, movies, or any other appropriate video media content. In this example, the primary video content 104 is compressed video content stored in a compressed video format such as, for example, MPEG-2 (sometimes referred to as H.262), MPEG-2.2 (i.e. MPEG-2 Part 2, also known as ISO/IEC 13818-2), MPEG-4, MPEG4 part 10, ITU-T H.264 (sometimes referred to as Advanced Video Codec (AVC), ISO/IEC 14496-10, MPEG-4 Part 10 Advanced Video Coding, or Joint Video Team (JVT)). In some implementations, the primary video content 104 includes a series of I-frames, P-frames, and B-frames that can be decoded by a display system to display the primary video content 104.

The content server 102 receives one or more secondary video content segments 108 from the secondary video content provider 110. The secondary video content 108 can also be stored in a compressed video format such as those discussed above with respect to the primary video content 104. In some implementations, the primary video content 104 represents content that is intended for a wider audience of users while the secondary video content 108 is content that is intended for a smaller subset of users. For example, the primary video content 104 can be a television program intended for a national audience while the secondary video content 108 can be content that is distributed (e.g., transmitted) specifically to a particular geographic region or locality (e.g., a country, state, or city). For example, the primary video content 104 can be a national news program while the secondary video content 108 is a regional news segment or weather forecast. As another example, the primary content 104 can be a program about national sports leagues while the secondary video content 108 contains information on local sports teams (e.g., local high school sports). As yet another example, the primary video content 104 can be a comedy program while the secondary video content 108 is a promotion for a local business that is specific to a geographic region where the business is located. In each of these examples, the secondary video content 108 that is distributed to different geographic regions at any specific time can include different presentation content.

In some implementations, the primary video content 104 is longer form content while the secondary video content 108 is shorter form content. For example, the primary video content 104 can be an hour long program while the secondary video content 108 can be a series of shorter one minute videos. In some implementations, the primary video content 104 and the secondary video content 108 are the same relative type of content. For example, both the primary video content 104 and the secondary video content 108 may be ten minute documentaries that are presented one after the other.

The content server 102 splices together the primary video content 104 with the secondary video content 108 to generate a combined video presentation 112. For example, the content server 102 can splice the secondary video content 108 onto the end of the primary video content 104 such that after the last frame of the primary video content 104 is displayed, the first frame of the secondary video content 108 is displayed. In some implementations, rather than splicing the secondary video content 108 onto the end of the primary video content 104, the content server 102 splices some or all of the secondary video content 108 with a portion of the primary video content 104 at a splice point identified within the primary video content 104. The content server 102 can splice the primary video content 104 with the secondary video content 108 such that the combined video presentation 112 begins by showing a portion of the primary video content 104 and switches to presenting all or a portion of the secondary video content 108 at a designated splice point. The portion of the secondary video content 108 that is included in the combined video presentation 112 can start at the beginning of the secondary video content 108, or can start at a splice point identified within the secondary video content 108. Numerous techniques for identifying splice points within the primary video content 104 and the secondary video content 108 are known in the art, and therefore not discussed in this document.

The combined video presentation 112 is then transmitted to display systems for presentation to viewers through distribution channels such as a series of one or more communications networks. For example, the content server 102 can transmit the combined video presentation 112 to a television system 114 that includes, for example, a high definition television 116 and a set-top box 118 in communication with the television 116. The set-top box 118 can, for example, receive the combined video presentation 112 from the content server 102 through a cable television service and decode the frames of the combined video presentation 112 for display on the television 116. In some implementations, the television system 114 includes the television 116 but does not require the set-top box 118.

As additional examples, the content server 102 can provide the combined video presentation 112 for presentation to a user through a mobile device 120 (e.g., a smartphone) receiving streaming content from a cellular network provider, or through a computer 122 receiving content from a streaming media website (e.g., through an Internet, WAN, or LAN connection). In some implementations, other devices may be used to receive the combined video presentation 112, such as, for example, PDAs, tablet devices, or other devices capable of displaying video content.

The content server 102 employs processes for splicing the primary and secondary video content 104 and 108 such that all information necessary to display the frames of the primary video content 104 prior to the splice point and the information necessary to display the frames of the secondary video content 108 after the splice point is provided to the display system (e.g., the television system 114, mobile device 120, or computer 122). For example, turning to FIG. 2A, an example frame display sequence 200 for primary video content 104 is displayed. The primary content frame display sequence 200 shows the order in which a series of frames of the primary video content 104 are to be displayed in situations in which the primary video content 104 is not spliced with other video content. In the example shown, the display sequence for frames X1-X9 is displayed. FIG. 2B shows an example frame display sequence 210 for secondary video content 108. The secondary content frame display sequence 210 shows the order in which a series of frames of the secondary video content 108 are to be displayed in situations in which the secondary video content 108 is not spliced with other video content. In the example shown, the display sequence for frames Y1-Y4 is displayed.

Returning to FIG. 2A, during a splicing process for splicing the primary video content 104 with the secondary video content 108, the content server 102 identifies a splice point 202 in the primary video content 104. For example, the splice point 202 can be identified by meta data included with the primary video content 104, or can be identified by analyzing some or all of the frames of the primary video content 104. The content server 102 can then identify any B-frames in the primary video content 104 that occur within a specified number of frames prior to the splice point 202. For example, the content server 102 can access information for the 20 frames in the primary video content 104 that immediately proceed the splice point 202 and determine if any of those 20 frames are B-frames. In the example shown in FIG. 2A, assume that the content server 102 has identified that frames X2 and X4 are both B-frames. In this example, the content server 102 does not analyze frames X5-X9 to determine if they are B-frames because they are located after the splice point 202 in the primary content frame display sequence 200.

The content server 102 then determines if any of the identified B-frames located prior to the splice point 202 rely on information in a frame that is located after the splice point 202 in the primary content frame display sequence 200. As described above, a B-frame in a compressed video file relies on information included in a frame that is located after the B-frame in a display sequence. Therefore, in this example in which frames X2 and X4 have been identified as B-frames, each of X2 and X4 rely on information contained in a frame that appears later in the primary content frame display sequence 200 to be properly decoded and displayed by a video display system. Continuing with this example, the content server 102 can identify that frame X2 relies on information included in frame X3 to be decoded and that frame X4 relies on information contained in frame X6 to be decoded. For example, frame X2 may include a pointer that identifies frame X3 as a frame on which frame X2 depends to be properly rendered and frame X4 may include a pointer that identifies frame X6 as a frame on which frame X4 depends to be properly rendered. With regard to frame X2's dependence on frame X3, the content server 102 determines that frame X3 is located prior to the splice point 202 in the primary content frame display sequence 200. This means that frame X3 is to be included in the combined video presentation 112 resulting from the splicing of primary video content 104 and secondary video content 108 because all frames prior to the splice point 202 in the primary content frame display sequence 200 are to be displayed as part of the combined video presentation 112. Being as frame X3 is to be displayed as part of the combined video presentation 112, the content server 102 does not alter any information associated with frame X3.

With regard to frame X4's dependence on information included in frame X6, the content server 102 determines that frame X6 is located after the splice point 202 in the primary content frame display sequence 200. This indicates that frame X6 is not to be displayed in the combined video presentation 112 when the primary video content 104 is spliced with the secondary video content 108. Based on the determinations that frame X4 depends on information from frame X6 and that frame X6 is located after the splice point 202 in the primary content frame display sequence 200, the content server 102 can modify time stamp information for frame X6 to allow frame X6 to be provided to a video display system (for use in properly decoding frame X4) while also ensuring that frame X6 will not be displayed by the video display system. For example, the content server 102 can alter a presentation time stamp (PTS) for frame X6 by changing the PTS to a time that is prior to the presentation time of frame X4. For example, the content server 102 can alter the PTS for frame X6 such that the altered PTS for frame X6 is the same as the PTS for frame X2. In some implementations, the process can be successfully implemented by changing the PTS for frame X6 to any PTS that is equal to or earlier than the PTS for frame X3 (i.e., the frame that immediately proceeds frame X4). In implementations in which the frame X6 has an associated decoding time stamp (DTS), the content server 102 does not alter the DTS of the frame X6.

The content server 102 can then generate the combined video presentation 112 by taking frames from the primary video content 104 and frames from the secondary video content 108 and placing them in a frame transmission sequence 220 shown in FIG. 2C. The combined video frame transmission sequence 220 shows the order in which the content server 102 transmits frames for the combined video presentation 112 to a video display system (such as the television system 114, for example). The combined video frame transmission sequence 220 includes all frames from the primary content frame display sequence 200 that occur prior to the splice point 202, plus frame X6 due to frame X4's dependency on information included in frame X6. The combined video frame transmission sequence 220 also includes the frames from secondary content frame display sequence 210.

The combined video frame transmission sequence 220 includes the frame X6, but the frame X6 will not be presented by the video display system because the content server 102 has altered the PTS for frame X6 to indicate a time that is equal to or prior to the PTS for frame X3. In the example shown in FIG. 2C, the video display system receives the frames in the order shown by the combined video frame transmission sequence 220. The video display system will decode the frames in the order they are received and store the decoded frames in a frame buffer (sometimes referred to as a decoded picture buffer or "DPB"). In this example, frame X3 is received and decoded prior to frame X2 because frame X2 depends on frame X3 to be properly decoded and displayed. Similarly, frame X6 is received and decoded prior to frame X4 because frame X4 depends on frame X6 to be properly decoded and displayed. Because frame X6 is decoded and stored in the frame buffer prior to frame X4, the information included in frame X6 necessary for decoding frame X4 is available at the time that the video display system decodes frame X4. Upon decoding frame X4, decoded frame X4 is stored in the frame buffer.

The video display system then displays the frames in the order specified by the PTSs of the frames. In this example, the video display system retrieves frame X1 from the frame buffer and displays frame X1 first followed by frames X2, X3, and X4. The video display system can analyze the altered PTS for frame X6 and determine that frame X6 has already been presented (even though in reality, frame X6 was never presented) due to frame X6 having an altered PTS that indicates a time equal to or prior to the PTS for frame X3. Frame X6 is therefore not presented by the video display system. The video display system moves on to display frames Y1-Y2 (i.e., frames from the secondary video content 108) after displaying frame X4. Frame Y1 can be, for example, an I-frame and therefore can be decoded and displayed by the video display system without use of information from another frame. The subsequent frames (frames Y2-4) can be I-frames or P-frames, for example.

In some implementations, the altered PTS for frame X6 is determined using one or more factors relating to the PTSs of other frames, the location of frame X6 in the primary content frame display sequence 200, the location of frame X4 in the primary content frame display sequence 200, the size of the frame buffer, or attributes associated with the frame buffer of the video display system. For example, in some implementations, the altered PTS for frame X6 is selected to be equal to or prior to the PTS for the frame which immediately proceeds the frame that depends on frame X6. In the example in FIG. 2A, frame X4 depends from frame X6. Therefore, the PTS for frame X6 is altered to be equal to or prior to the PTS for frame X3 (the frame immediately prior to frame X4 in the primary content frame display sequence 200). In some implementations, the PTS for frame X6 is determined, in part, based on the amount of time frames are kept in the frame buffer. For example, the PTS for frame X6 must be selected such that frame X6 is still in the frame buffer when frame X4 is decoded. Therefore, the altered PTS for frame X6 must not be so far back in time that the video display system would purge frame X6 from the frame buffer prior to frame X4 being decoded. For example, if the frame buffer retains frames for 100 milliseconds (ms) prior to purging frames from the frame buffer, the content server 102 should set the altered PTS for frame X6 such that it is not more than 100 ms prior to the PTS (or alternatively, the DTS) for frame X4. In other words, the altered PTS for frame X6 can be set such that the altered PTS does not exceed a threshold time prior to a time stamp associated with the frame that depends on frame 6. The threshold time can be determined based on characteristics of the frame buffer, such as an amount of time that frames are kept in the frame buffer.

In some implementations, the PTS for frame X6 is altered by a set amount. For example, the PTS for frame X6 is altered by 20 ms. In other words, the 20 ms is subtracted from the original PTS for frame X6 to create the altered PTS for frame X6. As another example, the content server 102 generates the altered PTS by subtracting 100 ms from the original PTS for frame X6. In other examples, values of 10 ms, 15 ms, 25 ms, or 30 ms can be subtracted from the original PTS for frame X6 to create the altered PTS for frame X6. In some implementations, a time from between 5 ms-150 ms is subtracted from the original PTS for frame X6 to create the altered PTS for frame X6. In some implementations, the time subtracted from the original PTS for frame X6 is in the range of 10 ms-120 ms, 15 ms-100 ms, or 20 ms-50 ms.

In some implementations, a threshold value for frame presentation by a video display device is used to determine the adjustment factor for the altered PTS for frame X6. For example, a decoder in a video display device may release video frames when they match the decoder system time clock (STC) within a certain threshold value. The altered PTS for frame X6 can be determined using the threshold value for displaying frames.

In some implementations, when generating the combined video presentation 112, the content server 102 adjusts the time stamp (PTS) for each frame in the secondary video content 108 by a delta such that the PTSs for the frames of the secondary video content 108 dictate that the frames of the secondary video content 108 are presented after the frames of the primary video content 104 included in the combined video presentation 112. In the example shown in FIG. 2C, the PTSs for each of frames Y1-Y4 can be altered by a delta value such that frames Y1-Y4 are presented after frame X4 in the combined video presentation 112. The delta can be, for example, based off of the PTS of frame X4. In some implementations, the delta can be the PTS for frame X4 plus an amount of time that is required between presentations of each frame. For example, if the amount of time between each frame is 5 ms, the delta added to the PTSs for frames Y1-Y4 can be the PTS for frame X4 plus 5 ms. In some implementations, the PTS for the first non-presented frame of the primary video content 104 is used as the delta. For example, in the example shown in FIGS. 2A-C, the delta added to the PTSs of frames Y1-Y4 can be the PTS of frame X5 from the primary content frame display sequence 200.

In some implementations, rather than being decoded according to the order they are received, the video display system decodes frames according to decoding time stamps (DTSs) associated with the frames. In such implementations, the content server 102 can alter the PTS for a frame while leaving the original DTS for the frame to ensure that the frame is decoded at the proper time while also ensuring that the frame will not be presented by the video display system. For example, the content server 102 can alter the PTS for frame X6 (e.g., by subtracting 20 ms from the original PTS for frame X6) so that the video display system does not present frame X6. The content server 102 can leave the DTS for frame X6 as is so that frame X6 is decoded prior to frame X4 and the information included in frame X6 is available for use in decoding frame X4.

In some alternate embodiments, methods other than or in addition to altering a time stamp for a frame can be used to signal to the video display system that the frame should not be displayed. For example, refer to the previous example in which frame X4 depends on information from frame X6 to be properly decoded, but frame X6 is after the splice point 202 in the primary content frame display sequence 200 (and should therefore not be displayed as part of the combined video presentation 112). In some implementations, the content server 102 can set a "do not display" flag associated with frame X6 prior to transmitting the frame X6 to the video display system. The video display system can identify that the "do not display" flag associated with the frame X6 is set and bypass display of frame X6. As another example, the PTS for the frame X6 can be set to a special "flag" value to indicate that the frame X6 is to be decoded and stored in the frame buffer by the video display system, but is not to be displayed as part of the combined video presentation 112. For example, the content server 102 can set the PTS for frame X6 to "−1" or "0." This special PTS value for frame X6 can signal to the video display system that frame X6 should not be displayed.

In some implementations, a portion of the secondary video content 108 may be spliced with a portion of the primary video content 104 at location other than the beginning of the primary video content 104. For example, the content server 102 can identify a splice point in the secondary video content 108. The splice point can indicate a point (in the time dimension) at which presentation of frames from the secondary video content 108 within the combined video presentation 112 should begin. For example, referring to FIG. 2B, the splice point can be located between frames Y2 and Y3, this can indicate that only frames Y3 and Y4 (and subsequent frames) should be displayed as part of the combined video presentation 112 and frames Y1 and Y2 should not be displayed in the combined video presentation 112. Continuing with this example, Y3 may be a P-frame that depends on information from frame Y2 to be properly rendered. Thus, the video display system that receives and displays the combined video presentation 112 will require frame Y2 to accurately decode frame Y3. The content server 102 can alter at time stamp, such as the PTS, for frame Y2 in ways similar to those described above with respect to frame X6 such that frame Y2 can be transmitted to the video display system without being displayed by the video display system. For example, the content server 102 can subtract 20 ms from the PTS for frame Y2. Other factors or methods for generating the altered PTS for frame Y2, such as those described above for frame X6, can be utilized. The content server 102 can then transmit frames Y2 and Y3 to the video display system as part of the combined video presentation 112. The video display system will decode frame Y2 and store it in a frame buffer so that the information in frame Y2 is later available for use in decoding frame Y3. However, due to the altered time stamp for frame Y2, frame Y2 will not be displayed by the video display system. This is because when the video display system reads the PTS for frame Y2, the video display system will determine that frame Y2 has already been displayed (even though in reality frame Y2 has not been displayed) and will therefore bypass display of frame Y2.

Figure 3:
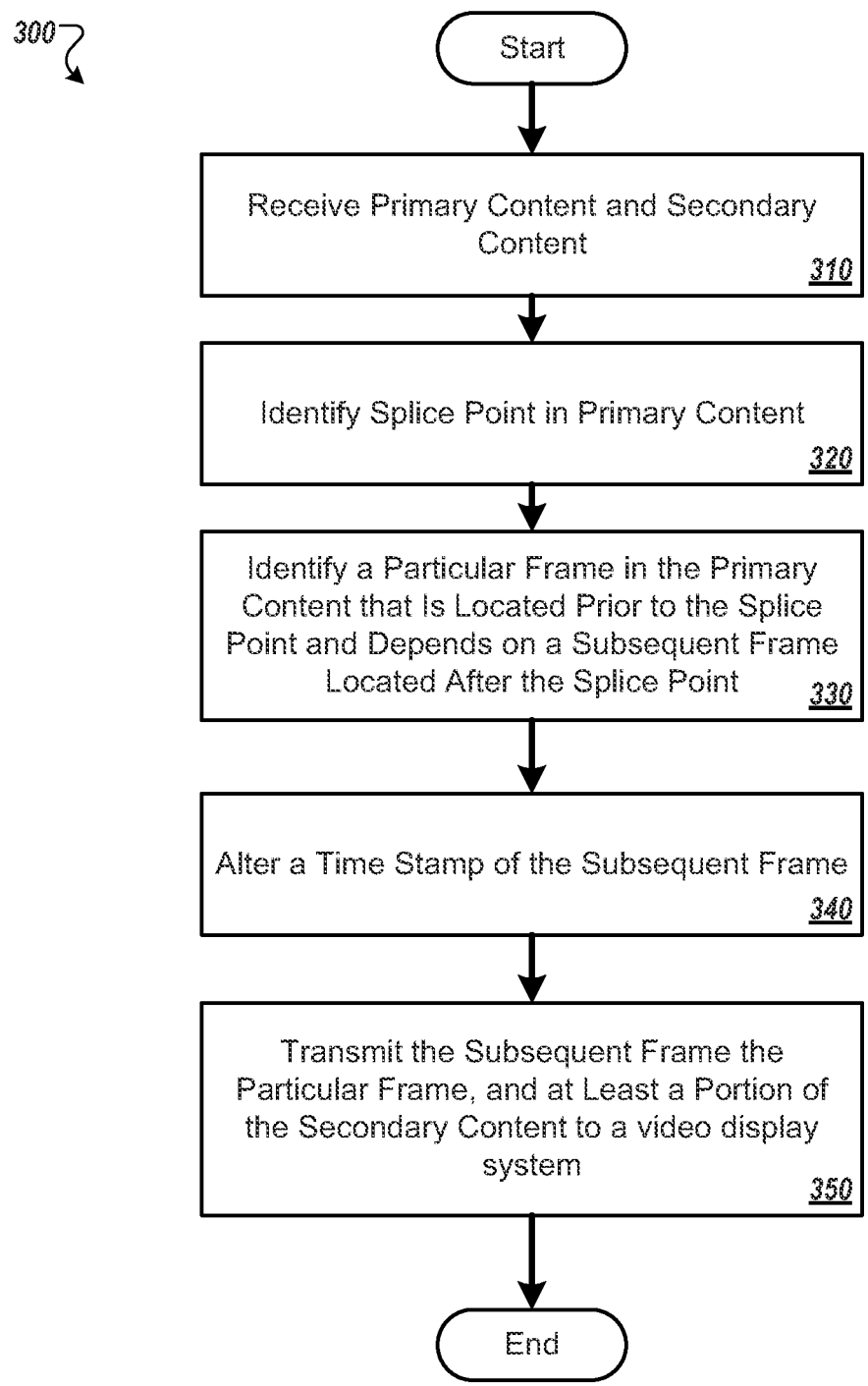
FIG. 3 is a flow diagram of an example process for splicing compressed video files.

FIG. 3 is a flow diagram of an example process 300 for splicing compressed video content. In some implementations, the process 300 may be performed by the content server 102 of FIG. 1. The process 300 begins by receiving primary content and secondary content (310). The primary and secondary content can be, for example, compressed video content. The primary compressed video content can be, for example, a television program while the secondary compressed video content can be, for example, a local news segment or a promotional video. The primary and secondary video content can be received from the same content provider or from different content providers.

A splice point in the primary content is identified (320). For example, meta data included with primary video content can identify a splice point for the primary video content. As another example, a computing system (such as the content server 102) that receives the primary video content can analyze the primary video content to identify a splice point. The computing system can analyze features of frames in the primary video content to identify one or more ideal splice points. In some implementations, the splice point is identified by a cue tone included with the primary video content identifies a splice point in the primary video content.

A particular frame in the primary content that is located (in the time dimension) prior to the splice point and depends on a subsequent frame located (in the time dimension) after the splice point is identified (330). For example, presentation time stamps (PTSs) associated with frames in the primary video content can dictate a presentation order for the frames in the primary video content. The computing system can identify a frame in the primary video content that is prior to the splice point that requires information included in a subsequent frame to be properly rendered and decoded. The computing system can then determine that the subsequent frame is after the splice point (and therefore should not be presented as part of a combined video presentation that includes frames from the primary video content prior to the splice point). The particular frame can be, for example, a B-frame that relies on information included in a subsequent frame for proper decoding and presentation by a video display system.

A time stamp for the subsequent frame is altered (340). For example, a PTS for the subsequent frame can be altered by subtracting an amount of time from the original PTS for the subsequent frame. For example, 20 ms can be subtracted from the PTS for the subsequent frame. As another example, 100 ms can be subtracted from the PTS for the subsequent frame. In some implementations, various factors are used in creating an altered PTS for a frame. For example, the amount of time that a frame is kept in the buffer of a video display system can be used as a factor in creating the altered PTS for the subsequent frame. As another example, a length of a "presentation-zone" time for a video display system can be used as a factor in altering the PTS for the subsequent frame. The "presentation-zone" can be, for example, a threshold time period around a current system time clock time in which frames having PTSs within that time period are displayed. The length of this presentation time period can be used in determining the altered PTS for the subsequent frame. The time stamp for the subsequent frame is altered such that the altered time stamp will be interpreted by a video display system that receives the subsequent frame in a way that causes the video display system to decode but not display the subsequent frame. For example, upon reading the altered time stamp for the subsequent frame, the video display system can make a determination that the frame has already been displayed (even though in reality, the subsequent frame has not been displayed by the video display system). The video display system will subsequently not display the subsequent frame.

The subsequent frame (including the altered time stamp information), the particular frame, and at least a portion of the secondary content are transmitted to a video display system (350). For example, referring to FIG. 2C, the combined video frame transmission sequence 220 includes frame X6 (the subsequent frame which includes an altered time stamp) and frame X4 (the particular frame that depends on the subsequent frame to be properly decoded and displayed) from the primary video content 104 and frames Y1-Y4 from the secondary video content 108. In some implementations, the frames are transmitted in an order in which they are to be decoded. In some implementations, prior to transmitting the portion of the secondary content, time stamps associated with each of the frames of the secondary content are altered by a delta factor such that the transmitted frames of the secondary content are displayed by a video display system after the particular frame is displayed.

Figure 4:
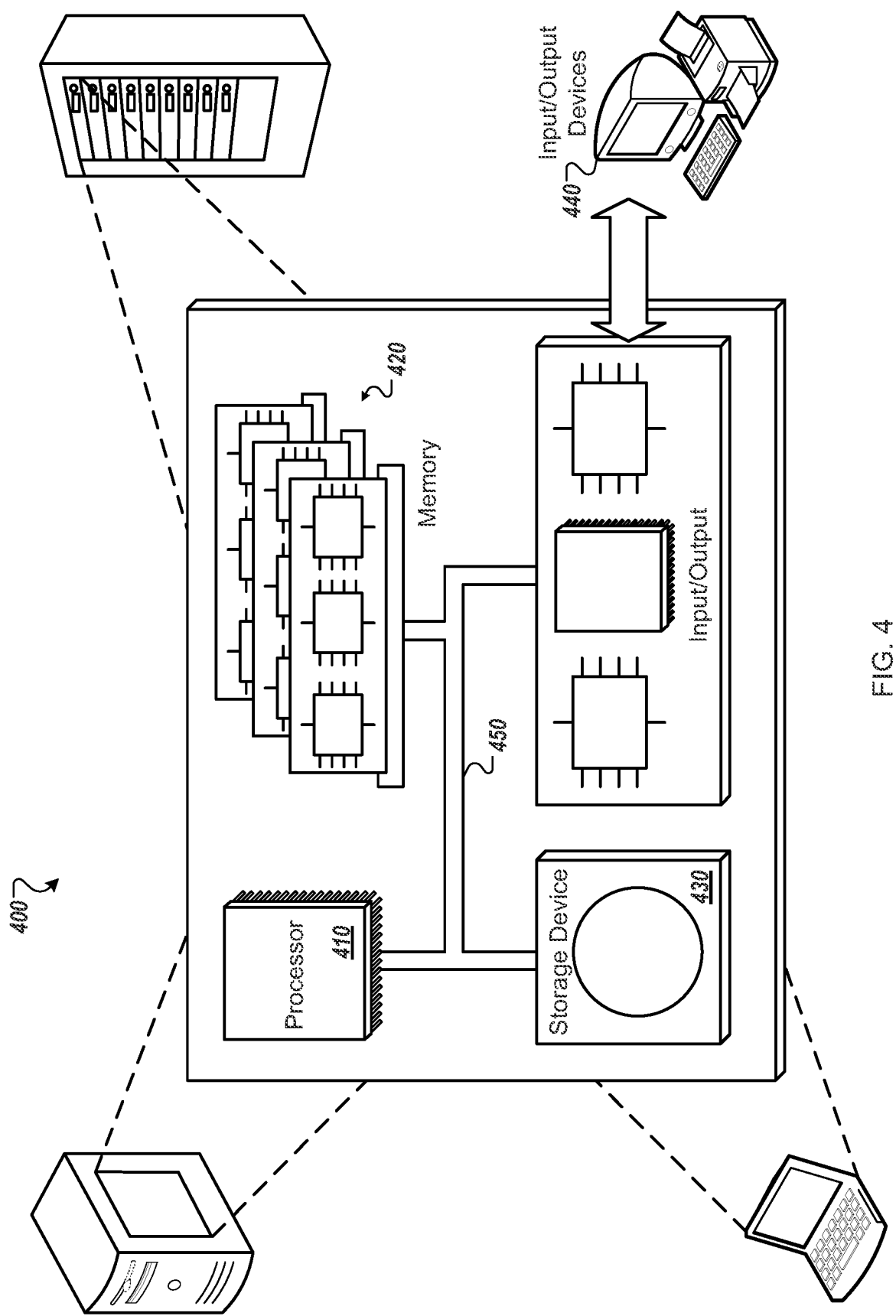
FIG. 4 is a schematic diagram of an example of a computer system that may be used to implement the systems and methods described in this document.

FIG. 4 is a schematic diagram of an example of a computer system 400 that may be used to implement the systems and methods described in this document. The system 400 can be used for the operations described in association with the method 300 according to one implementation.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving first compressed video content and second compressed video content;
   identifying a splice point for the first compressed video content;
   identifying a particular frame in the first compressed video content that precedes the splice point;
   determining that the particular frame is dependent on information associated with a subsequent frame of the first compressed video content that is after the splice point;
   altering time stamp information associated with the subsequent frame to have a presentation time stamp value that is prior to a presentation time stamp value of a frame that precedes the particular frame that precedes the splice point; and
   transmitting the particular frame, the subsequent frame having the altered time stamp information, and at least a portion of the second compressed video content, wherein the altered time stamp information causes the subsequent frame to be used to decode the particular frame and causes presentation of the subsequent frame to be inhibited.

2. The method of claim 1, wherein altering the time stamp information of the subsequent frame comprises:
   reading a presentation time stamp value associated with the subsequent frame;
   subtracting a particular value from the presentation time stamp value; and
   storing the resulting value of subtracting the particular value from the presentation time stamp value as the presentation time stamp for the subsequent frame associated with the altered time stamp information associated with the subsequent frame.

3. The method of claim 2, wherein the particular value is determined based on one or more characteristics of a frame buffer of the video presentation system.

4. The method of claim 3, wherein the one or more characteristics of the frame buffer comprises an amount of time that the video presentation system retains decoded frames in the frame buffer.

5. The method of claim 1, wherein transmitting the particular frame, the subsequent frame along with the altered time stamp information, and at least a portion of the second compressed video content comprises transmitting the subsequent frame prior to the particular frame and transmitting the at least a portion of the second compressed video content after the particular frame.

6. The method of claim 1, further comprising:
identifying a second splice point for the second compressed video content;
identifying an additional frame in the second compressed video content that is after the second splice point;
determining that the additional frame depends on information included in a preceding frame of the second compressed video content that is before the second splice point; and
altering time stamp information of the preceding frame, wherein altering the time stamp information of the preceding frame is performed (1) by the computing system, (2) in response to determining that the additional frame depends on information included in the preceding frame, and (3) prior to transmitting the particular frame, the subsequent frame along with the altered time stamp information, and at least a portion of the second compressed video content.

7. The method of claim 6, wherein the at least the portion of the second compressed video includes the additional frame and the preceding frame.

8. A system comprising:
a hardware processor that is configured to:
receive first compressed video content and second compressed video content;
identify a splice point for the first compressed video content;
identify a particular frame in the first compressed video content that precedes the splice point;
determine that the particular frame is dependent on information associated with a subsequent frame of the first compressed video content that is after the splice point;
alter time stamp information associated with the subsequent frame to have a presentation time stamp value that is prior to a presentation time stamp value of a frame that precedes the particular frame that precedes the splice point; and
transmit the particular frame, the subsequent frame having the altered time stamp information, and at least a portion of the second compressed video content, wherein the altered time stamp information causes the subsequent frame to be used to decode the particular frame and causes presentation of the subsequent frame to be inhibited.

9. The system of claim 8, wherein altering the time stamp information of the subsequent frame comprises:
reading a presentation time stamp value associated with the subsequent frame;
subtracting a particular value from the presentation time stamp value; and
storing the resulting value of subtracting the particular value from the presentation time stamp value as the presentation time stamp for the subsequent frame associated with the altered time stamp information associated with the subsequent frame.

10. The system of claim 9, wherein the particular value is determined based on one or more characteristics of a frame buffer of the video presentation system.

11. The system of claim 10, wherein the one or more characteristics of the frame buffer comprises an amount of time that the video presentation system retains decoded frames in the frame buffer.

12. The system of claim 8, wherein transmitting the particular frame, the subsequent frame along with the altered time stamp information, and at least a portion of the second compressed video content comprises transmitting the subsequent frame prior to the particular frame and transmitting the at least a portion of the second compressed video content after the particular frame.

13. The system of claim 1, wherein the hardware processor is further configured to:
identify a second splice point for the second compressed video content;
identify an additional frame in the second compressed video content that is after the second splice point;
determine that the additional frame depends on information included in a preceding frame of the second compressed video content that is before the second splice point; and
alter time stamp information of the preceding frame, wherein altering the time stamp information of the preceding frame is performed (1) by the computing system, (2) in response to determining that the additional frame depends on information included in the preceding frame, and (3) prior to transmitting the particular frame, the subsequent frame along with the altered time stamp information, and at least a portion of the second compressed video content.

14. The system of claim 13, wherein the at least the portion of the second compressed video includes the additional frame and the preceding frame.

15. A non-transitory computer-readable medium containing computer executable instructions that, when executed by a processor, cause the processor to perform a method, the method comprising:
receiving first compressed video content and second compressed video content;
identifying a splice point for the first compressed video content;
identifying a particular frame in the first compressed video content that precedes the splice point;
determining that the particular frame is dependent on information associated with a subsequent frame of the first compressed video content that is after the splice point;
altering time stamp information associated with the subsequent frame to have a presentation time stamp value that is prior to a presentation time stamp value of a frame that precedes the particular frame that precedes the splice point; and
transmitting the particular frame, the subsequent frame having the altered time stamp information, and at least a portion of the second compressed video content, wherein the altered time stamp information causes the subsequent frame to be used to decode the particular frame and causes presentation of the subsequent frame to be inhibited.

16. The non-transitory computer-readable medium of claim 15, wherein altering the time stamp information of the subsequent frame comprises:
reading a presentation time stamp value associated with the subsequent frame;
subtracting a particular value from the presentation time stamp value; and
storing the resulting value of subtracting the particular value from the presentation time stamp value as the presentation time stamp for the subsequent frame associated with the altered time stamp information associated with the subsequent frame.

17. The non-transitory computer-readable medium of claim 16, wherein the particular value is determined based on one or more characteristics of a frame buffer of the video presentation system.

18. The non-transitory computer-readable medium of claim 17, wherein the one or more characteristics of the frame buffer comprises an amount of time that the video presentation system retains decoded frames in the frame buffer.

19. The non-transitory computer-readable medium of claim 13, wherein transmitting the particular frame, the subsequent frame along with the altered time stamp information, and at least a portion of the second compressed video content comprises transmitting the subsequent frame prior to the particular frame and transmitting the at least a portion of the second compressed video content after the particular frame.

20. The non-transitory computer-readable medium of claim 13, wherein the method further comprises:

identifying a second splice point for the second compressed video content;

identifying an additional frame in the second compressed video content that is after the second splice point;

determining that the additional frame depends on information included in a preceding frame of the second compressed video content that is before the second splice point; and altering time stamp information of the preceding frame, wherein altering the time stamp information of the preceding frame is performed (1) by the computing system, (2) in response to determining that the additional frame depends on information included in the preceding frame, and (3) prior to transmitting the particular frame, the subsequent frame along with the altered time stamp information, and at least a portion of the second compressed video content.

21. The non-transitory computer-readable medium of claim 20, wherein the at least the portion of the second compressed video includes the additional frame and the preceding frame.

* * * * *